PHANTASTRON CIRCUITS

Filed Dec. 13, 1954 4 Sheets-Sheet 1

BURTON L. CORDRY
*INVENTOR.*

*BY*
*Killman and Kerst*
ATTORNEYS

Feb. 25, 1958 B. L. CORDRY 2,824,960

PHANTASTRON CIRCUITS

Filed Dec. 13, 1954 4 Sheets-Sheet 2

BURTON L. CORDRY
*INVENTOR.*

BY

Hillman and Kerst
ATTORNEYS

Feb. 25, 1958 B. L. CORDRY 2,824,960

PHANTASTRON CIRCUITS

Filed Dec. 13, 1954 4 Sheets-Sheet 3

BURTON L. CORDRY
*INVENTOR.*

*BY*

Killman and Kerst
ATTORNEYS

Feb. 25, 1958 B. L. CORDRY 2,824,960

PHANTASTRON CIRCUITS

Filed Dec. 13, 1954 4 Sheets-Sheet 4

BURTON L. CORDRY
*INVENTOR.*

*BY*

Killman and Kerst
ATTORNEYS

United States Patent Office 2,824,960

Patented Feb. 25, 1958

2,824,960

PHANTASTRON CIRCUITS

Burton L. Cordry, Baltimore, Md., assignor to Bendix Aviation Corporation, Towson, Md., a corporation of Delaware Application December 13, 1954, Serial No. 474,885

5 Claims. (Cl. 250—27)

This invention relates to phantastron circuits and in particular, to improvements thereto.

The phantastron circuits are generators of the "flip-flop" variety that serve as excellent timing devices. Their excellent timing characteristics are attributable to a linear timing wave produced through the use of the "Miller sweep" circuit. Because of the presence of high negative feedback, the linearity is relatively independent of tube parameters.

In a phantastron circuit, the duration of a timing wave is basically determined by the slope of the "run-down" curve and the level of the "bottoming-point." The slope of the run-down is primarily fixed by the values of the resistor and the capacitor in the RC timing combination. Drift chargeable to these components may be reduced to a negligible amount by the proper choice with respect to temperature coefficients, quality, etc.

The more important problem for precision measuring is the variation which occurs in the bottoming-point. This point, which is relatively close to ground potential, is the point at which the bulk of the current is transferred to the screen grid and the regenerative-cut-off of the tube begins. Because it depends on various factors within the circuit, slight variations in any one will cause cycle-to-cycle variations in the timing wave.

The present invention provides a means for reducing to a negligible amount the variations of the end point in the run-down and for producing an output pulse at the time when the end point is reached. Although other means for accomplishing this have been presented in the past, the present invention circumvents inherent problems of the previously disclosed methods.

An object of the present invention is to improve in phantastron circuits the consistency of the cycle-to-cycle timing duration, which is commonly referred to as jitter.

Another object of the present invention is to improve in phantastron circuits the consistency of the cycle-to-cycle wave duration with a minimum number of components and power requirements, so as to reduce the overall size and the possibility of component failures through shock and vibration.

A further object of the invention is to provide a linear method for varying the wave duration in phantastron circuits.

A still further object is to provide at the end point of a phantastron run-down a pulse with a short duration and excellent rise and fall characteristics which is available for timing purposes.

Still another object is to maintain this output pulse at a relatively constant amplitude over the range of operation.

Another object is to provide the output from a low impedance source without requiring additional components.

These and other objects are present in a system employing a phantastron circuit of the type utilizing a cathode-follower circuit in the feedback loop. The invention requires the addition of a diode and a triode in such a manner that these tubes and the triode of the phantastron cathode-follower each perform dual functions. Through this economical utilization of components, a more compact and efficient operation is obtained.

Referring to the drawings.

Figure 1:
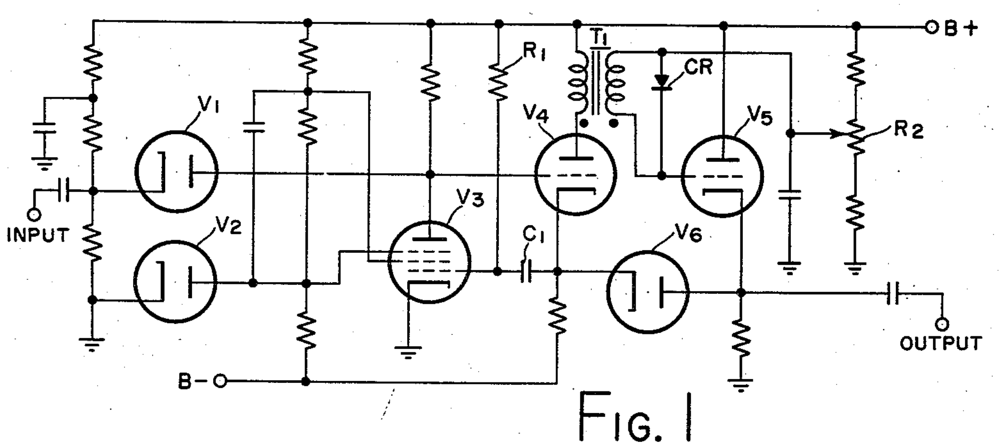
Fig. 1 is a schematic diagram of a circuit utilizing the invention.
Figure 2:
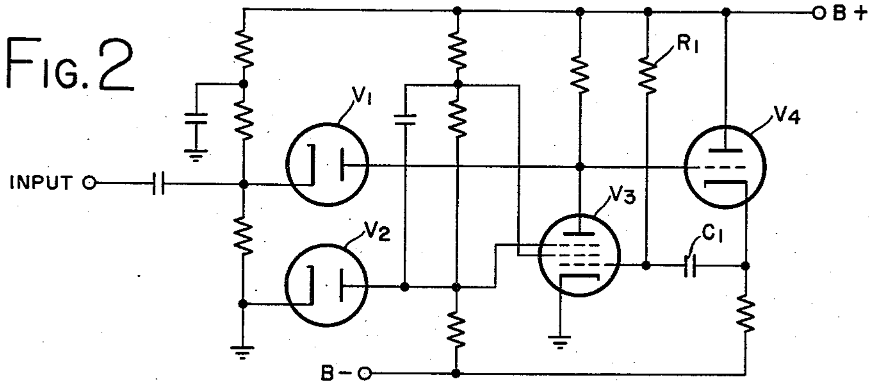
Fig. 2 is a schematic diagram of the phantastron circuit of Fig. 1.
Figure 4:
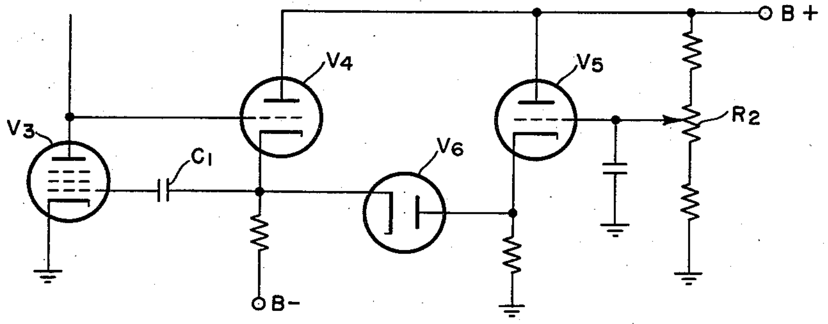
Figure 5:
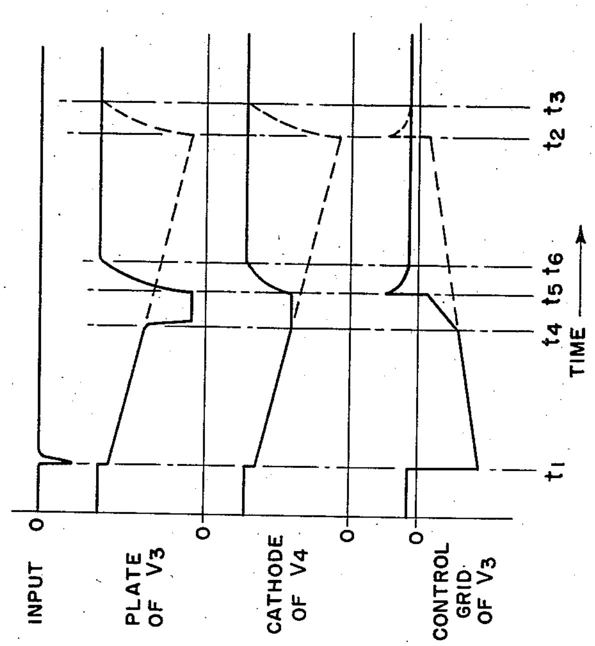
Figure 8:
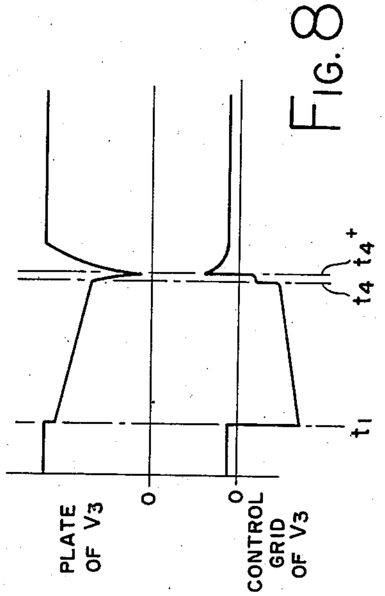
Figure 3:
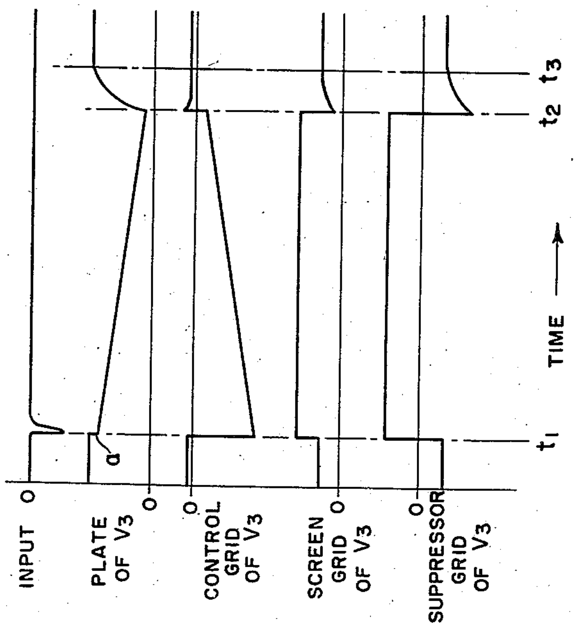
Figure 6:
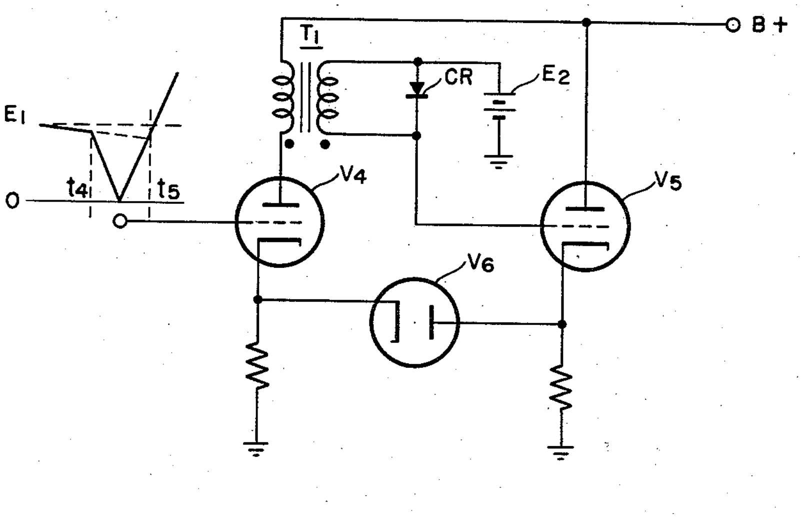
Figures 7A, 7B, 7C:
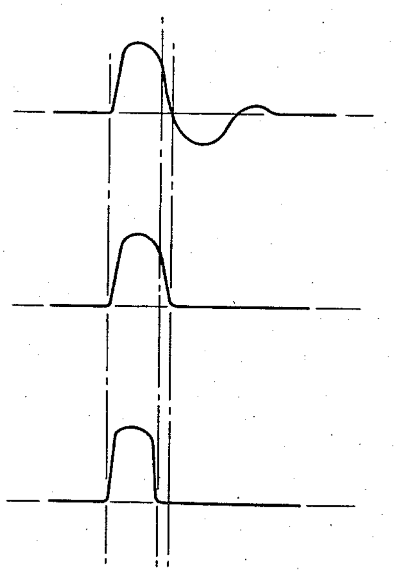
Figure 9:
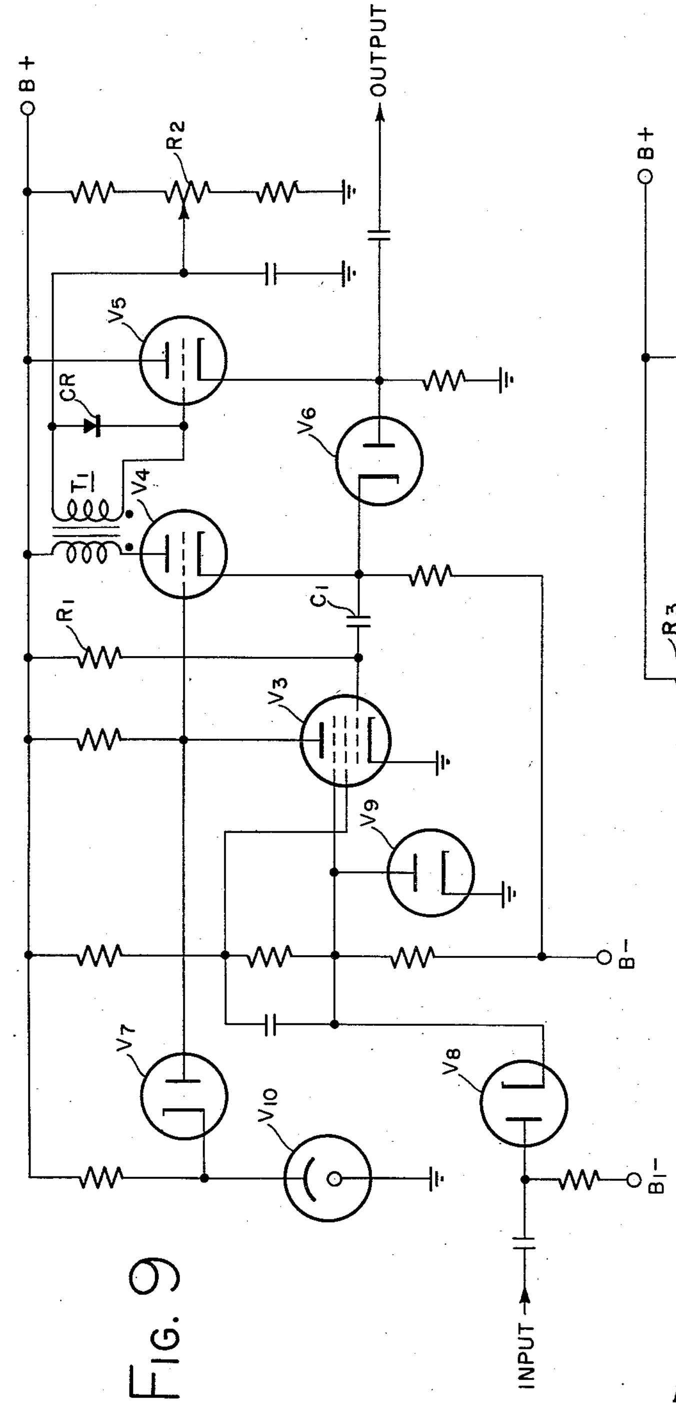

Fig. 3 consists of waveforms of signals at various locations in the circuit of Fig. 2;

Fig. 4 is a schematic diagram of a portion of the circuit of Fig. 1;

Fig. 5 consists of waveforms of signals at various locations in the circuit of Fig. 4;

Fig. 6 is a schematic diagram of a portion of the circuit of Fig. 1;

Figs. 7*a* to 7*c* consist of waveforms of signals appearing across the secondary winding of the transformer of the circuit of Fig. 6;

Fig. 8 consists of waveforms of signals appearing at locations in the circuit of Fig. 1;

Fig. 9 is a schematic diagram of a version of the circuit of Fig. 1; and

Figure 10:
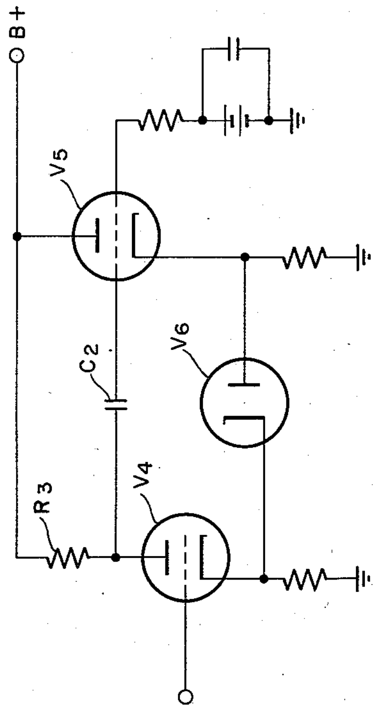

Fig. 10 is a schematic diagram of the circuit illustrated in Fig. 6.

Referring in particular to Fig. 1, a schematic diagram of a circuit is illustrated which exemplifies one application of the invention. Tubes $V_1$, $V_2$, $V_3$ and $V_4$ comprise the phantastron circuit, while tubes $V_4$, $V_5$ and $V_6$ comprise a circuit encompassing the invention. Because the tubes $V_4$, $V_5$ and $V_6$ perform dual functions, and these functions, are intricately interwoven, it has been found desirable to discuss each function separately and then the effects thereof. Therefore, the following discussion, in cooperation with Figs. 2 through 8, will describe the operations of portions of the circuit.

The basic functions occurring are:

(1) Phantastron run-down
(2) Amplitude comparison
(3) Pulse forming and
(4) Phantastron reset Referring to Fig. 2, a schematic diagram of the phantastron portion of the circuit is presented. Because transformer $T_1$ of Fig. 1 does not influence the run-down, it has been omitted. This operation is well set-out in the literature, so only the basic steps will be described in conjunction with the waveforms of Fig. 3.

The tube $V_1$ performs the functions of injecting the trigger pulse and clamping the plate of the tube $V_3$ to the voltage reference level determined by the voltage divider connected to the cathode of the tube $V_1$. The tube $V_2$ prevents the suppressor grid of the tube $V_3$ from becoming sufficiently positive so as to become fixed at that level because of secondary emission from the plate. It also prohibits the suppressor grid from experiencing a large voltage variation, thereby permitting rapid transitions to occur within the tube $V_3$. The tube $V_3$ is the control tube for the Miller sweep circuit. A link in the plate-to-control-grid feedback path of the tube $V_3$ is provided by the tube $V_4$, which also provides a low-resistance charge-up path for a capacitor $C_1$. A resistor $R_1$ and the capacitor $C_1$ provide the timing combination.

Referring to Fig. 3 a brief description of the operation of the circuit of Fig. 2 is as follows:

Prior to the time $t_1$, the control grid of the tube $V_3$ is slightly positive with respect to the cathode (which is connected to ground). The screen grid is conducting sufficiently so that the potential existing on the suppressor grid, because of the voltage divider connected thereto, is negative with respect to the ground potential.

Therefore, no plate current is flowing and the plate is at a potential as clamped by tube $V_1$.

When a negative triggering pulse is injected through the tube $V_1$, it will be coupled via the cathode follower tube $V_4$ to the control grid of the tube $V_3$. This will cause the screen grid current to decrease and the suppressor grid to become positive. Plate current will then begin to flow with the resulting drop in plate potential being coupled to the control grid via the cathode follower tube $V_4$ and the capacitor $C_1$. This feedback is in a negative sense in that the voltage produced on the control grid tends to restrict the plate current. Consequently, the amount of plate current flowing is determined by the control grid potential, which in turn is determined by plate current. Therefore, the point *a* of Fig. 3 is determined by the loop parameters.

Because the cathode of the tube $V_4$ has decreased in potential level at time $t_1$, the capacitor begins to accumulate a charge via the resistor $R_1$. This charge makes the control grid less negative, which in turn permits an increase in plate current. The increase in plate current causes another drop in plate voltage, which, when coupled to the grid, tends to reduce the plate current. The net result is a slight increase in plate current with a resultant drop in plate voltage. Because of the negative feedback, the capacitor $C_1$ accumulates a charge at a uniform rate and the voltages of the plate of tube $V_3$ and the cathode of the tube $V_4$ decrease at a uniform rate.

The plate potential decreases at a constant rate until it cannot drop any farther. This is commonly referred to as the "bottoming-point." At this time there is no voltage fed back to the control grid, so the negative potential will tend to decrease at a rate determined by the resistor $R_1$ and the capacitor $C_1$. As the plate current has reached saturation, the screen grid begins to take the excess of the electrons passing through the control grid. Therefore the screen grid voltage decreases in value and pulls the voltage on the suppressor grid down to where the suppressor grid begins to cut-off the plate current. This will increase the screen grid current, which will in turn reduce the suppressor grid voltage. This regenerative action operates so as to cause a rapid cut-off in plate current at the time $t_2$. The changes occurring between the times $t_2$ and $t_3$ are caused by stray capacitances in the circuitry, as the capacitor $C_1$ is charged-up very rapidly through the low impedance cathode follower comprising the tube $V_4$. At the time $t_3$, the circuit has returned to its initial condition.

The next function that will be considered is amplitude comparison. Fig. 4 is a schematic diagram of the portion of the circuit of Fig. 1 that performs the amplitude comparison. Once again the transformer $T_1$ has been omitted as it does not influence this operation.

This function, in effect opens the plate-to-control-grid feedback circuit of the tube $V_3$. By so doing, the dependency on the bottoming-point to terminate the run-down is eliminated. This is accomplished by setting the potential on the plate of the tube $V_6$ through the use of the divider network comprising a resistor $R_2$. When the potential on the cathode of the tube $V_4$ falls to a level to cause conduction through the tube $V_6$, the potential thereon will be clamped and the feedback to the control grid of the tube $V_3$ will be interrupted. This is shown in Fig. 5 wherein the broken lines indicate the normal phantastron run-down, while the solid lines indicate the results produced by the amplitude comparison circuit. The cathode of the tube $V_4$ is clamped at the time $t_4$, so the potential on the control grid of $V_3$ will begin to rise at a rate dictated by the time constant of $R_1C_1$. Because of the relatively rapid change in grid potential, the plate current soon reaches saturation and the excess electrons are attracted by the screen grid. As the control grid continues to rise, the screen grid current will increase until the potential on the suppressor grid begins to cut-off the plate current. The regenerative action as previously described takes place at the time $t_5$. The transients between the times $t_5$ and $t_6$ are those that occurred previously in Fig. 3 between the times $t_2$ and $t_3$.

The advantages of the amplitude comparison circuit is realized when the sharp well-defined break-point of a diode is considered. The stability of the level of the voltage gradient necessary to cause current to flow exceeds the stability of the plate bottoming-point.

The third function of pulse forming will be explained by the use of the schematic diagram shown in Fig. 6, which is a portion of the circuit of Fig. 1. For simplicity of explanation, a source $E_2$ replaces the voltage divider comprising the resistor $R_2$. Assume an input signal as illustrated wherein the potential level $E_1$ exceeds the potential of the source $E_2$ and the slope thereof is not sufficiently steep to be passed by the pulse transformer $T_1$. When the level of the input signal is $E_1$, the cathode of the tube $V_4$ is at a higher potential level than the cathode of the tube $V_5$. Therefore, the tube $V_6$ is not conducting. When the level on the grid of the tube $V_4$ falls until its cathode potential reaches that on the cathode of the tube $V_5$, tube $V_6$ conducts and can be considered a short circuit between the two cathodes. Now, if as illustrated in Fig. 6, the signal on the grid of the tube $V_4$ begins to fall rapidly at time $t_4$, the current through the tube $V_4$ begins to decrease rapidly. The resultant plate rise is coupled through transformer $T_1$, the cathode follower tube $V_5$ and diode coupling tube $V_6$ back to the tube $V_4$, completing a regenerative loop which rapidly cuts off the current in the tube $V_4$.

If the diode CR is temporarily eliminated, the wave form that is produced by the discharging of the energy originally stored in the transformer $T_1$ is illustrated in Fig. 7*a*. The steep wave front is produced by the regenerative cut-off of the plate current, while the negative overshoot is a typical oscillation as produced by energy storage devices. The addition of the diode CR will eliminate the negative overshoot as shown in Fig. 7*b*.

If the positive going input signal reaches the cut-off potential of tube $V_4$, as indicated at the time $t_5$ of Fig. 6, before the pulse of Fig. 7*b* decreases appreciably, a regenerative plate current turn-on will occur in the tube $V_4$ until the potentials on the cathodes cause the tube $V_6$ to cease conducting. This regenerative action produces a steep trailing edge on the pulse. This is illustrated in Fig. 7*c*.

The input signal to the circuit of Fig. 6 is obtained from the phantastron circuit. The rapid voltage fall-off is illustrated in Fig. 5 at the time $t_4$. The rapid voltage rise is caused by the use of the fourth function, which will now be explained.

The sharp regenerative rise in tube $V_5$ at the time $t_4$ will cause a positive transient to occur across the cathode resistor of the tube $V_4$. This is coupled to the control grid of the tube $V_3$ so that the plate thereof rapidly bottoms. At this time, normal phantastron transients occur whereby the suppressor grid regains control and the plate rapidly returns to the clamped-voltage. It is the rapid return of the plate that causes the second regenerative action to provide the sharp trailing edge. The phantastron has therefore been reset and is ready for the next triggering input signal. This is illustrated in Fig. 8.

The interval between the times $t_1$ and $t_4$ may be changed by adjusting the contact arm of the resistor $R_2$. This will cause the potential level $E_1$ to vary and consequently, it will change the magnitude of the plate current through the tube $V_4$ at the beginning of the first regenerative action. If the transformer $T_1$ is operated in a saturated condition for all potential levels $E_1$, a relatively constant amplitude of the output pulses will be obtained.

A constant output pulse level will be obtained if the values of the resistor $R_1$ and/or capacitor $C_1$ are made variable and the voltage divider comprising the resistor $R_2$ is fixed.

As stated previously, one of the functions of the tube $V_1$ is to clamp the plate of the tube $V_3$ when it is not conducting to a fixed voltage level. While clamping, a small but finite current will flow through the tube $V_1$, which will not flow when clamping is not taking place. Therefore the reference level will shift and cause the starting point of the phantastron run-down to change. This may be remedied by triggering the phantastron via the suppressor grid and providing a VR tube in place of one of the resistors of the voltage divider supplying the clamping means. Slight changes in current produced by the clamping action will not cause the voltage on the cathode of the clamper tube to vary and therefore the starting point for the run-down will always be the same. A circuit embodying this refinement is illustrated in Fig. 9.

In practice, it was found that when the invention was applied to a phantastron circuit having a better-than-average regulated power supply and a D. C. voltage supply for the filament of the phantastron tube $V_3$, the pulse-to-pulse jitter was less than 0.001%. The linearity of the overall circuit was found to be equal to that of other phantastron circuits. As in most circuits providing a precision operation, the present invention may have numerous refinements in the forms of temperature compensation, closer voltage regulation, over and under compensation in different circuits, etc. to improve the short and long time stability characteristics, the jitter, linearity, etc. Such refinements are obvious to those skilled in the art.

The transformer $T_1$ may be replaced with an RC coupling network, as illustrated by a resistor $R_3$ and a capacitor $C_2$ in Fig. 10. The resistor $R_3$ is chosen to be much smaller than the cathode resistor of the tube $V_4$ so that that tube $V_4$ will still function as a cathode follower. Although the regenerative loop as previously described is maintained, the RC coupling network enters into the D. C. considerations, as the capacitor $C_2$ will assume a charge. The amount of the charge that will accumulate is a function of the potential level of the end-point of the phantastron run-down. Because of this, the amplitude and width of the output pulse will vary with the end-point of the phantastron run-down.

Although several particular circuits utilizing the invention have been presented, it is to be understood that other uses, as evident to those skilled in the art, are possible.

What is claimed is:

1. In a phantastron circuit of the type utilizing a cathode follower in the feedback circuit to provide a low resistance recharging path for the timing capacitor, a means to provide a terminal end-point for the run-down of the said phantastron circuit that does not coincide with the bottoming-point thereof and to provide an output pulse at the occurrence of the said end-point, comprising: a second cathode follower; voltage producing means in the plate circuit of the first said cathode follower sensitive to the rate of change in a decreasing sense of the current therethrough; means coupling the last said means to the input of the said second cathode follower so that the signals on the grid of the said second cathode follower are in phase with those on the plate of the said first cathode follower; a polarity and amplitude voltage sensitive means; means connecting the said voltage sensitive means between the cathodes of the said cathode followers so that a current will flow therethrough when the potential on the cathode of the said second cathode follower exceeds the potential on the cathode of the said first cathode follower.

2. In a phantastron circuit of the type utilizing a cathode follower in the feedback circuit to provide a low resistance recharging path for the timing capacitor, a means to provide a terminal end-point for the run-down of the said phantastron circuit that does not coincide with the bottoming-point thereof and to provide an output pulse at the occurrence of the said end-point, comprising: a second cathode follower; voltage producing means in the plate circuit of the first said cathode follower sensitive to the rate of change in a decreasing sense of the current therethrough; means coupling the last said means to the input of the said second cathode follower so that the signals on the grid of the said second cathode follower are in phase with those on the plate of the said first cathode follower; a unidirectionally conducting element; means connecting the said element between the cathodes of the said cathode followers so that a current will flow therethrough when the potential on the cathode of the said second cathode follower exceeds the potential on the cathode of the said first cathode follower.

3. In a phantastron circuit of the type utilizing a cathode follower in the feedback circuit to provide a low resistance recharging path for the timing capacitor, a means to provide a terminal end-point for the run-down of the said phantastron circuit that does not coincide with the bottoming-point thereof and to provide an output pulse at the occurrence of the said end-point, comprising: a second cathode follower; a pulse transformer; means connecting the primary winding of the said transformer in the plate circuit of the first said cathode follower; means coupling the secondary winding of the said transformer to the input of the said second cathode follower so that the signals on the grid of the said second cathode follower are in phase with those on the plate of the said first cathode follower; a unidirectionally conducting element; means connecting the said element across the said secondary winding so that only positive polarity signals are coupled to the said grid; a second unidirectionally conducting element; means connecting the said second element between the cathodes of the said cathode followers so that a current will flow therethrough when the potential on the cathode of the said second cathode follower exceeds the potential on the cathode of the said first cathode follower.

4. In a phantastron circuit of the type utilizing a cathode follower in the feedback circuit to provide a low resistance recharging path for the timing capacitor, a means to provide a terminal end-point for the run-down of the said phantastron circuit that does not coincide with the bottoming-point thereof and to provide an output pulse at the occurrence of the said end-point, comprising: a second cathode follower; an RC coupling network; means connecting the resistor of the said network in the plate circuit of the first said cathode follower; the said resistor having, with respect to the cathode resistor of the said first cathode follower, a relatively low value of resistance; means coupling the output terminal from the said network to the input terminal of the said second cathode follower; a unidirectionally conducting element; means connecting the said element between the cathodes of the said cathode followers so that a current will flow therethrough when the potential on the cathode of the said second cathode follower exceeds the potential on the cathode of the said first cathode follower.

5. In a phantastron circuit of the type utilizing a cathode follower in the feedback circuit to provide a low resistance recharging path for the timing capacitor, a means to provide a terminal end-point for the run-down of the said phantastron circuit that does not coincide wth the bottoming-point thereof, comprising: voltage producing means in the plate circuit of said cathode follower sensitive to the rate of change in a decreasing sense of the current therethrough; a source of reference potential lying within the range of the excursions of the potential on the cathode of the cathode follower; and means contituting a feedback loop coupled between the last mentioned means and the cathode of said cathode follower so that the signals applied to the cathode of said cathode follower by said feedback loop are in phase with those appearing on the plate of said cathode follower; said feedback loop comprising a polarity and amplitude voltage sensitive means biased in the non-conductive direction by said source of reference potential and so connected that a current will flow therethrough when the potential on said cathode of said cathode follower falls below the potential on said source.

References Cited in the file of this patent

UNITED STATES PATENTS 2,552,949 Fleming-Williams ______ May 15, 1951

OTHER REFERENCES

"Waveforms," Radiation Laboratory Series, by Chance et al., vol. 19, first edition, 1949.